United States Patent
Wang

(10) Patent No.: US 11,058,043 B2
(45) Date of Patent: Jul. 13, 2021

(54) ROW UNIT POSITION CONTROL SYSTEM

(71) Applicant: CNH Industrial Canada, Ltd., Saskatoon (CA)

(72) Inventor: Ling Wang, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 344 days.

(21) Appl. No.: 16/150,114

(22) Filed: Oct. 2, 2018

(65) Prior Publication Data

US 2020/0100421 A1 Apr. 2, 2020

(51) Int. Cl.
| A01B 63/00 | (2006.01) |
| A01B 63/28 | (2006.01) |
| A01B 49/06 | (2006.01) |
| A01B 76/00 | (2006.01) |
| A01B 63/30 | (2006.01) |
| A01B 63/32 | (2006.01) |

(52) U.S. Cl.
CPC .............. *A01B 63/28* (2013.01); *A01B 49/06* (2013.01); *A01B 63/30* (2013.01); *A01B 63/32* (2013.01); *A01B 76/00* (2013.01)

(58) Field of Classification Search
CPC ......... A01B 63/28; A01B 63/30; A01B 63/32; A01B 63/008; A01B 63/24; A01B 63/002; A01B 63/1112; A01B 76/00; A01B 49/06; A01B 73/048; A01C 7/208
See application file for complete search history.

(56) References Cited

U.S. PATENT DOCUMENTS

| 4,427,207 | A | * | 1/1984 | Gafford | A01B 63/22 172/401 |
| 4,611,545 | A | * | 9/1986 | Nickeson | A01C 7/006 111/52 |
| 4,927,165 | A | * | 5/1990 | Murray | A01B 63/22 280/43.23 |
| 4,945,997 | A | * | 8/1990 | Adee | A01B 73/065 111/57 |
| 6,422,483 | B1 | * | 7/2002 | Yocom | A01M 7/0053 239/159 |
| 6,640,733 | B2 | | 11/2003 | Huffmeyer | |
| 8,850,997 | B2 | | 10/2014 | Silbernagel et al. | |
| 8,950,260 | B2 | | 2/2015 | Gelinske et al. | |
| 9,113,591 | B2 | | 8/2015 | Shivak | |
| 9,345,189 | B2 | | 5/2016 | Harmelink et al. | |
| 9,554,504 | B2 | | 1/2017 | Houck | |
| 9,591,799 | B2 | | 3/2017 | Henry | |
| 9,756,777 | B2 | | 9/2017 | Chahley et al. | |

(Continued)

FOREIGN PATENT DOCUMENTS

EP 1005791 6/2000

*Primary Examiner* — Jessica H Lutz
(74) *Attorney, Agent, or Firm* — Rebecca L. Henkel; Rickard K. DeMille

(57) ABSTRACT

An agricultural implement system that includes a first toolbar section, a first row unit coupled to the first toolbar section, a second toolbar section, a second row unit coupled to the second toolbar section, and a row unit position control system. The system includes a sensor that detects an angle of the second toolbar section with respect to the first toolbar section. A controller couples to the sensor. The controller raises the first row unit and/or the second row unit in response to the angle to block contact of the first row unit and/or the second row unit with the ground.

20 Claims, 6 Drawing Sheets

(56) References Cited

U.S. PATENT DOCUMENTS

| | | | |
|---|---|---|---|
| 9,801,330 B2 | 10/2017 | Bent et al. | |
| 9,826,677 B2 | 11/2017 | Gervais et al. | |
| 9,848,524 B2 | 12/2017 | Sauder et al. | |
| 9,908,720 B2 | 3/2018 | Roberge et al. | |
| 10,314,223 B2* | 6/2019 | Stark | A01B 63/24 |
| 10,517,238 B2* | 12/2019 | Sporrer | A01G 25/097 |
| 2002/0043194 A1* | 4/2002 | Kinzenbaw | A01C 7/208 |
| | | | 111/54 |
| 2011/0284252 A1* | 11/2011 | Friggstad | A01B 73/06 |
| | | | 172/310 |
| 2013/0277442 A1 | 10/2013 | Ballu | |
| 2014/0190711 A1* | 7/2014 | Horsch | A01B 73/048 |
| | | | 172/1 |
| 2015/0245556 A1* | 9/2015 | Prickel | A01C 7/208 |
| | | | 701/50 |
| 2016/0175869 A1 | 6/2016 | Sullivan et al. | |
| 2016/0286780 A1 | 10/2016 | Leeb et al. | |
| 2017/0006758 A1* | 1/2017 | Dienst | A01B 63/22 |
| 2017/0027103 A1 | 2/2017 | Groteluechen et al. | |
| 2017/0251657 A1 | 9/2017 | Leeb | |
| 2018/0014450 A1* | 1/2018 | Dienst | A01B 63/22 |

\* cited by examiner

ROW UNIT POSITION CONTROL SYSTEM

BACKGROUND

The present disclosure relates to agricultural equipment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure.

Accordingly, it should be understood that these statements are to be read in this light, and not as an admission of any kind.

Seeding implements are typically towed behind a tractor or other work vehicle. For example, a tongue of the seeding implement may be connected to a drawbar of the tractor, or a mast of the seeding implement may be connected to a hitch of the tractor. In order to plant the seeds, the seeding implements typically include a ground engaging tool or opener that forms a trench for seed deposition into the soil. As the implement travels across a field, the opener excavates a trench into the soil, and seeds are deposited into the trench.

BRIEF DESCRIPTION

In one embodiment, an agricultural implement system that includes a first toolbar section, a first row unit coupled to the first toolbar section, a second toolbar section, a second row unit coupled to the second toolbar section, and a row unit position control system. The system includes a sensor that detects an angle of the second toolbar section with respect to the first toolbar section. A controller couples to the sensor. The controller raises the first row unit and/or the second row unit in response to the angle to block contact of the first row unit and/or the second row unit with the ground.

In another embodiment, a system including a row unit position control system. The row unit position control system includes a controller that couples to a sensor. The controller raises a first row unit and/or a second row unit to block contact of the first row unit and/or the second row unit with the ground in response to an angle of a first toolbar section with respect to a second toolbar section.

In another embodiment, an agricultural implement system that includes a first toolbar section, a first ground engaging tool coupled to the first toolbar section, a second toolbar section, and a second ground engaging tool coupled to the second toolbar section. The agricultural implement system also includes a row unit position control system with a controller. The controller raises the first ground engaging tool and/or the second ground engaging tool in response to an angle of the second toolbar section with respect to the first toolbar section to block contact of the first ground engaging tool and/or the second ground engaging tool with the ground.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Modern farming uses a variety of agricultural implements to harvest crops, prepare the soil for planting, and for planting. These agricultural implements are commonly referred to as harvesters, tillers, and planters. Planters enable seed planting by first opening a trench in the soil with an opening system. The planter then deposits seeds into the trench, after which the trench is covered with soil by a closing system. However, planters may travel over uneven ground as they plant rows of seeds. For example, the planter may travel over uneven ground that simultaneously places part of the planter on level ground and other portions of the planter on an incline. In order to optimize the yield of some crops, there may be an optimal distance between rows. This distance enables the plants in each row receive sufficient light, water, fertilizer, and space to grow, which may increase crop production from a given piece of land. However, uneven ground may decrease the distance between ground engaging tools and/or row units as portions of the planter are at different inclines. A decrease in the distance between the ground engaging tools and/or row units decreases the distance between rows and thus may form rows with undesirable spacing. Undesirable spacing between rows may stunt the growth of the seeds as the plants compete for nutrients, which may result in unharvestable crops and thus wasted seed and fertilizer. In some situations, the uneven ground may also cause the ground engaging tools and/or row units to contact one another. The discussion below focuses on a row positioning control system that detects when different sections of a planter are at different inclines that may reduce the distance between neighboring ground engaging tools and/or row units below a threshold distance. In response, the row positioning control system may move one or more ground engaging tools and/or row units to maintain a desired distance between rows and/or block contact between neighboring ground engaging tools/row units.

Figure 1:
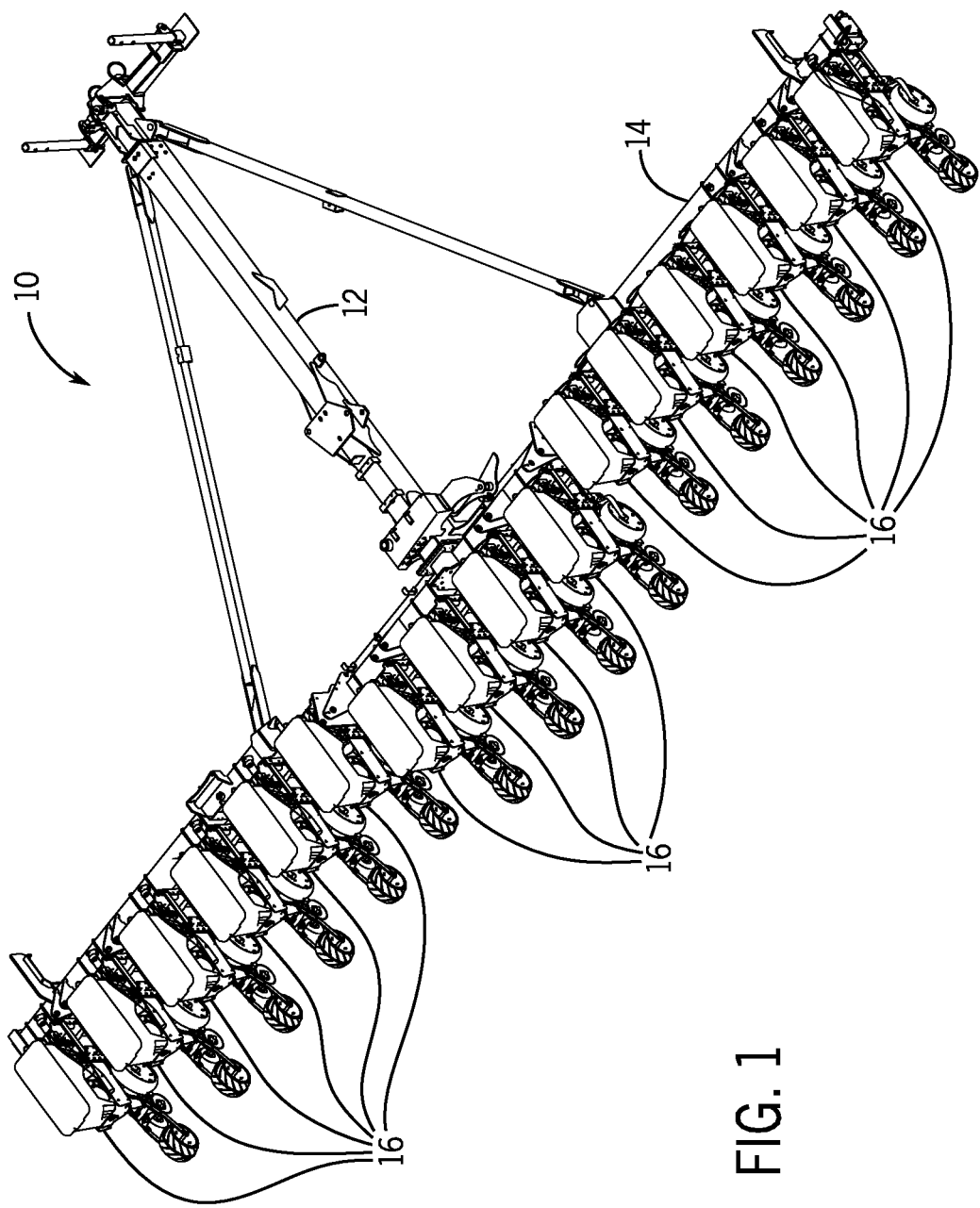
FIG. 1 is a perspective view of an embodiment of an agricultural implement.

Turning now to the drawings, FIG. 1 is a perspective view of an agricultural implement or system 10 (e.g., planter). The implement 10 is designed to be towed behind a work vehicle such as a tractor. The implement 10 includes a tongue assembly 12 which is shown in the form of an A-frame hitch assembly. The tongue assembly 12 may include a hitch used to attach to an appropriate tractor hitch via a ball, clevis, or other coupling. For example, a tongue of the implement 10 may be connected to a drawbar of the tractor, or a mast of the implement may be connected to a 3-point hitch of the tractor. The tongue assembly 12 is coupled to a toolbar 14 which supports multiple seeding implements or row units 16. The toolbar 14 includes multiple sections that couple together at pivot points. The ability of the sections to pivot relative to each other enables the implement 10 to plant on uneven ground.

Each row unit 16 may include an opener disk rotatably coupled to a chassis of the row unit 16 and configured to engage soil. The row unit 16 also includes a gauge wheel assembly movably coupled to the chassis. The gauge wheel assembly includes a gauge wheel configured to rotate across a soil surface to limit a penetration depth of the opener disk into the soil. In addition, the row unit 16 includes a depth control actuator extending between the chassis and the gauge wheel assembly. The depth control actuator is configured to adjust the penetration depth of the opener disk by varying the position of the gauge wheel relative to the chassis. A down force actuator extending between the toolbar and the chassis is configured to vary a contact force between the gauge wheel and the soil surface. Each row unit 16 may also include an adjustable closing system that closes the trench formed by the opening system. As will be explained below, the adjustable closing system may include one or more sensors that detect the position of one or more row units 16 and in response to the detected position(s) lifts one or more row units 16 to facilitate planting.

Figure 2:
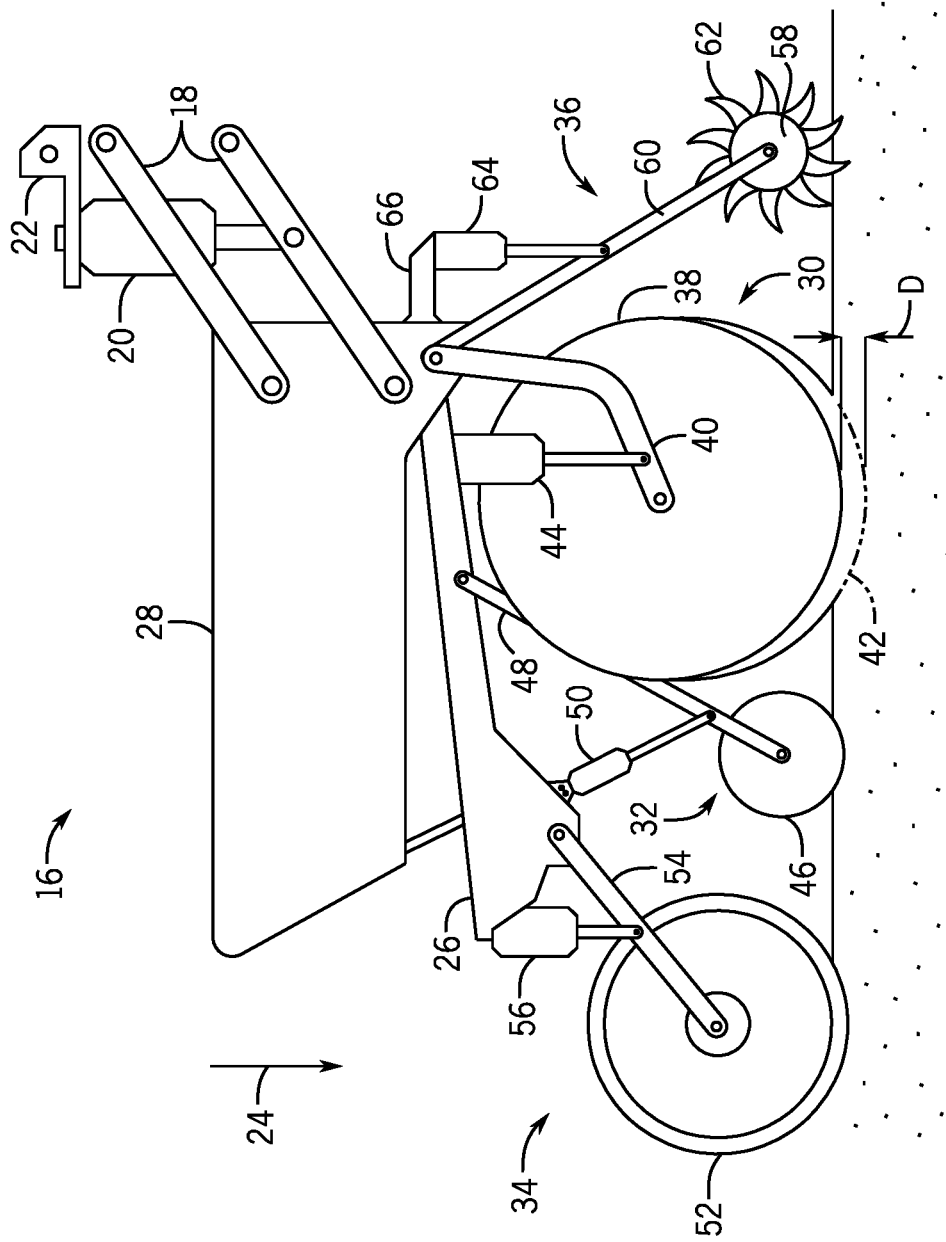
FIG. 2 is a side view of an embodiment of a row unit of the agricultural implement in FIG. 1.

FIG. 2 is a side view of an exemplary row unit 16 of the agricultural implement 10 shown in FIG. 1. The row unit 16 includes elements 18 of a parallel linkage assembly, also known as a four bar linkage, configured to couple the row unit 16 to the toolbar 14 (e.g., toolbar sections), while enabling vertical movement of the row unit 16. In addition, a down force actuator 20 extends between a mounting bracket 22 and a lower portion of the parallel linkage to establish a contact force between the row unit 16 and the soil. The down force actuator 20 is configured to apply a force to the row unit 16 in a downward direction 24, thereby driving a ground engaging tool into the soil. As will be appreciated, a desired level of down force may vary based on soil type, the degree of tillage applied to the soil, soil moisture content, amount of residue cover, and/or tool wear, among other factors. Because such factors may vary from one side of the implement 10 to the other, a different level of down force may be selected for each row unit 16.

Furthermore, a desired level of down force may be dependent on the speed at which the row unit 16 is pulled across the field. For example, as speed increases, the ground engaging tools may have a tendency to rise out of the ground due to the interaction between the soil and the tool. Consequently, a greater down force may be applied during higher speed operation to ensure that the ground engaging tools remain at a desired depth. In addition, the weight of the row unit 16 applies a force to the ground engaging tools in the downward direction 24. However, as seeds and/or other products are transferred from a storage container on the row unit 16 to the soil, the weight of the row unit 16 decreases. Therefore, the down force actuator 20 may apply a greater force to the row unit 16 to compensate. Because each row unit 16 includes an independent down force actuator 20, the contact force may vary across the implement 10, thereby establishing a substantially uniform seed deposition depth throughout the field. As will be explained below, the down force actuator 20 may also be used to lift the row unit 16 to block contact between the ground engaging tool and the soil. The ability to lift the row unit 16 away from the soil enables the implement 10 to maintain a desired spacing between planting rows as well as block/reduce undesired contact between row units 16 as the implement 10 travels over uneven ground.

In the present embodiment, the parallel linkage elements 18 are pivotally coupled to a chassis 26 and a frame 28. The frame 28 may be configured to support various elements of the row unit 16 such as a metering system and a product storage container, for example. As illustrated, the chassis 26 supports an opener assembly 30, a closing assembly 32, a press wheel assembly 34, and a residue manager assembly 36. In the present configuration, the opener assembly 30 includes a gauge wheel assembly having a gauge wheel 38 and a rotatable arm 40 which functions to movably couple the gauge wheel 38 to the chassis 26. The gauge wheel 38 may be positioned a vertical distance D above an opener disk 42 to establish a desired trench depth for seed deposition into the soil. As the row unit 16 travels across a field, the opener disk 42 excavates a trench into the soil, and seeds are deposited into the trench. The opener assembly 30 also includes a depth control cylinder 44 extending between the chassis 26 and the rotatable arm 40 of the gauge wheel assembly. The depth control cylinder 44 is configured to adjust the penetration depth D of the opener disk 42 by varying a position of the gauge wheel 38 relative to the chassis 26. While one opener assembly 30 is illustrated in the present embodiment, it should be appreciated that alternative embodiments may include a pair of opener assemblies 30 positioned on opposite sides of the chassis 26. In such configurations, the opener disks 42 may be angled toward one another to establish a wider trench within the soil.

Seeds may be deposited within the excavated trench via a seed tube extending between a metering system coupled to/within the frame 28 and the soil. The seed tube exit may be positioned aft of the opener assembly 30 and forward of the closing assembly 32 such that seeds flow into the trench. Closing disks 46 of the closing assembly 32 push the excavated soil into the trench, thereby closing the trench. As illustrated, the closing assembly 32 includes an arm 48 extending between the chassis 26 and the closing disk 46. A closing disk cylinder 50 is coupled to the arm 48 of the closing assembly 32, and configured to regulate a contact force between the closing disk 46 and the soil. For example, a large contact force may be applied to effectively push dense soil into the trench, while a relatively small contact force may be applied to close a trench with loose soil. While one closing disk 46 is shown in the present embodiment, it should be appreciated that alternative embodiments may include a pair of closing disks 46. In addition, certain embodiments may employ closing wheel(s) instead of the illustrated closing disk 46.

As illustrated, a press wheel 52 of the press wheel assembly 34 is positioned aft of the closing assembly 32, and serves to pack soil on top of the deposited seeds. In the present embodiment, the press wheel assembly 34 includes an arm 54 extending between the chassis 26 and the press wheel 52. A press wheel cylinder 56 is coupled to the arm 54 of the press wheel assembly 34, and configured to regulate a contact force between the press wheel 52 and the soil. For example, in dry conditions, it may be desirable to firmly pack soil directly over the seeds to seal in moisture. In damp conditions, it may be desirable to leave the soil over the seeds fairly loose in order to avoid compaction which may result in seed crusting. The process of excavating a trench into the soil, depositing seeds within the trench, closing the trench and packing soil on top of the seeds establishes a row of planted seeds within a field. By employing multiple row units 16 distributed along the toolbar 14, as shown in FIG. 1, multiple rows of seeds may be planted within the field.

Certain embodiments of the row unit 16 may employ a residue manager assembly 36 to prepare the ground before seed deposition. As illustrated, the residue manager assembly 36 includes a wheel 58 coupled to the chassis 26 by an arm 60. The wheel 58 includes tillage points or fingers 62 configured to break up crop residue on the soil surface. A residue manager cylinder 64 extends from a bracket 66 to the arm 60 of the residue manager assembly 36, and configured to regulate a contact force between the wheel 58 and the soil. While a single residue manager wheel 58 is shown in the present embodiment, it should be appreciated that alternative embodiments may include a pair of wheels 58 angled toward one another. In the present embodiment, the residue manager assembly 36 may serve as a shock absorber to dissipate row unit bounce caused by contact with rocks or piles of residue, thereby protecting mechanical components of the row unit 16.

Figure 3:
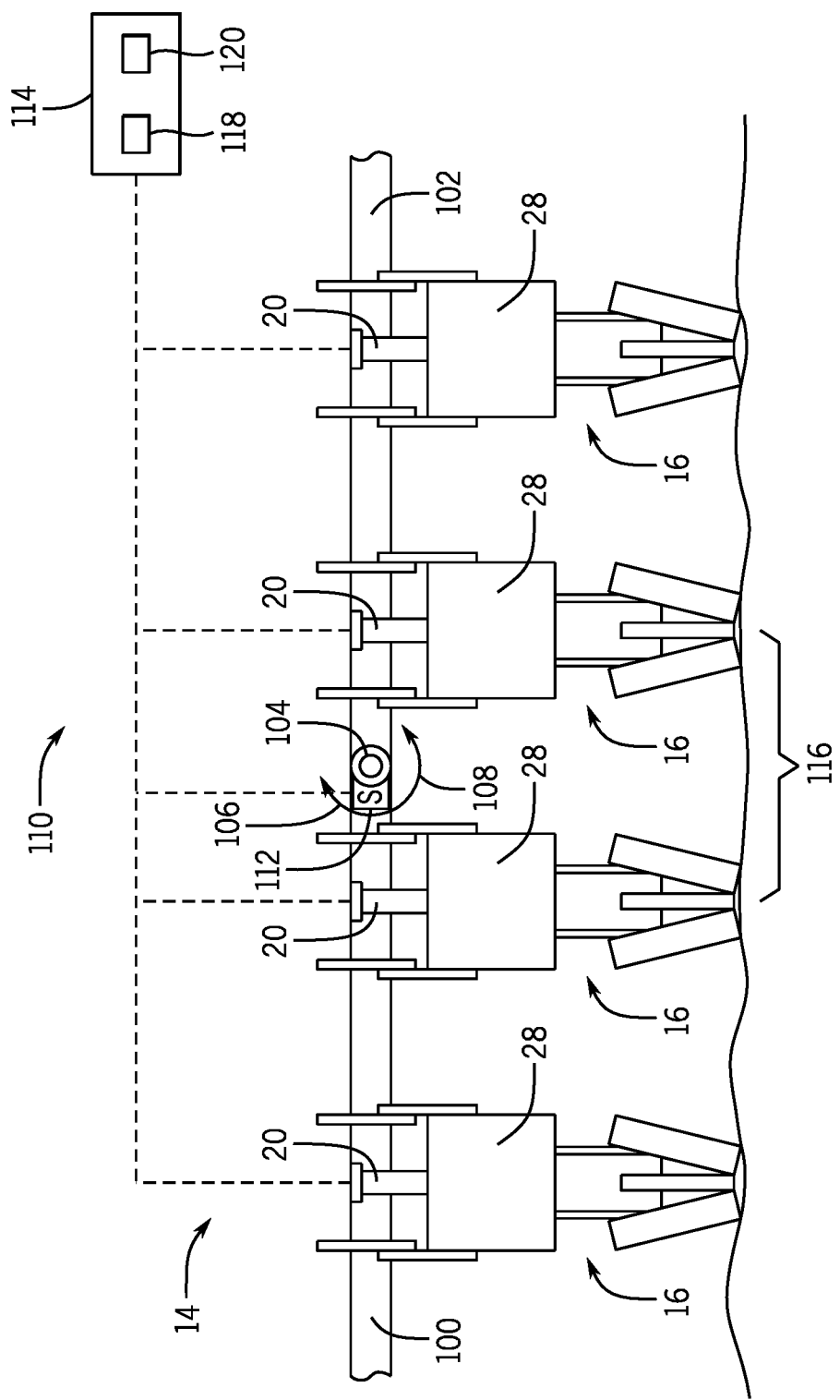
FIG. 3 is a partial rear view of an embodiment of an agricultural implement with row units on level ground.

FIG. 3 is a partial rear view of an embodiment of the agricultural implement 10 with row units 16 on level ground. The row units 16 couple to sections 100 and 102 of the toolbar 14. The sections 100 and 102 couple together at a pivot connector 104 (e.g., pivot pin). The pivot connector 104 enables the sections 100 and 102 to rotate relative to each other in directions 106 and 108. The ability of the sections 100 and 102 to rotate relative to each other enables the agricultural implement 10 to traverse uneven ground while planting. More specifically, it enables the row units 16 to maintain contact with the ground as the agricultural implement 10 travels over uneven ground. While two sections of the toolbar 14 are illustrated, it should be understood that the toolbar 14 may include multiple sections (e.g., 2, 3, 4, 5, 6, 7, 8, 9, 10, or more) with neighboring sections coupled together with respective pivot connectors 104.

As will be explained in detail below, the agricultural implement 10 includes a row unit position control system 110 that detects the rotation of the sections 100 and 102 with a sensor 112 (e.g., a rotation sensor, angular position sensor). As the sensor 112 detects rotation, the sensor 112 emits a signal indicative of the amount of rotation. A controller 114 receives this signal and processes it to determine the relative position of the section 100 to the section 102. By determining the position of the section 100 relative to the section 102, the controller 114 is able to detect whether the distance 116 between the row units 16 on the sections 100 and 102 that are proximate the pivot connector 104 is less than a threshold distance. In other words, are the row units 16 (on the sections 100 and 102) that are proximate the pivot connector 104 so close together that they either contact each other and/or are end up planting rows so close together that plant growth may be affected. If they are, the row unit position control system 110 actuates the down force actuator 20 to lift one or both of the row units 16 proximate the pivot connector 104.

The controller 114 may include a processor 118 and a memory 120 used in processing one or more signals from one or more sensors 112 (e.g., rotation sensors, angular position sensors). For example, the processor 118 may be a microprocessor that executes software to control the various actuators on the row unit 16 in response to feedback from the sensors 112. The processor 118 may include multiple microprocessors, one or more "general-purpose" microprocessors, one or more special-purpose microprocessors, and/or one or more application specific integrated circuits (ASICS), or some combination thereof. For example, the processor 118 may include one or more reduced instruction set (RISC) processors.

The memory 120 may include a volatile memory, such as random access memory (RAM), and/or a nonvolatile memory, such as read-only memory (ROM). The memory 120 may store a variety of information and may be used for various purposes. For example, the memory 120 may store processor executable instructions, such as firmware or software, for the processor 118 to execute. The memory may include ROM, flash memory, a hard drive, or any other suitable optical, magnetic, or solid-state storage medium, or a combination thereof. The memory may store data, instructions, and any other suitable data.

Figure 4:
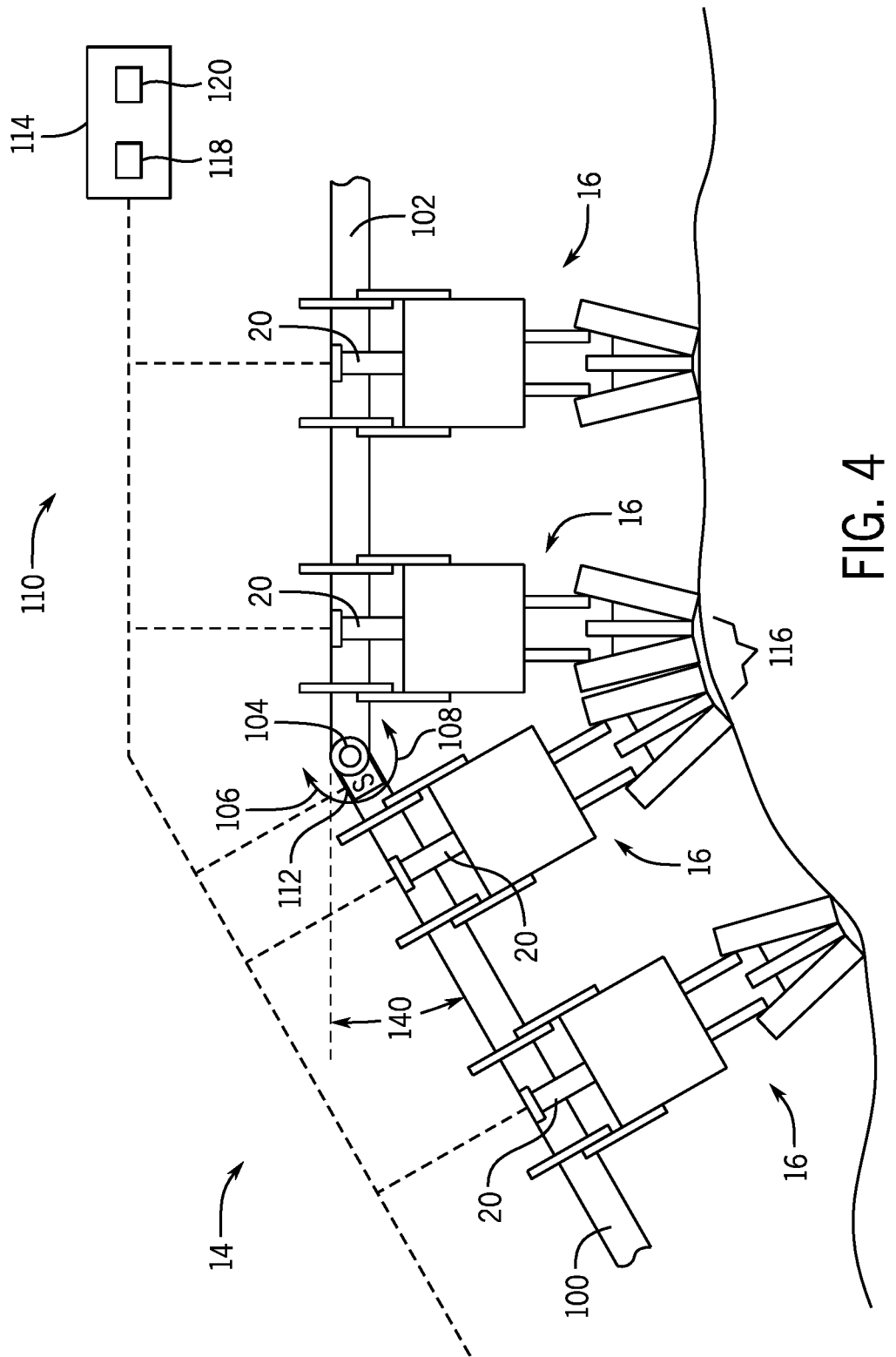
FIG. 4 is a partial rear view of an embodiment of an agricultural implement with row units on uneven ground.

FIG. 4 is a partial rear view of an embodiment of the agricultural implement 10 on uneven ground. As illustrated, as the agricultural implement 10 travels over uneven ground the sections 100, 102 are able to rotate relative to each other. In FIG. 4, the section 100 rotates in direction 108 as a portion of the agricultural implement 10 travels over a down slope. More specifically, the section 100 rotates through an angle 140 with respect to the section 100. If the angle 140 is too great, the row units 16 proximate the pivot connector 104 may contact each other and/or the rows may be so close together that plant growth is hindered. That is, the distance 116 between the rows may decrease below a threshold value.

Figure 5:
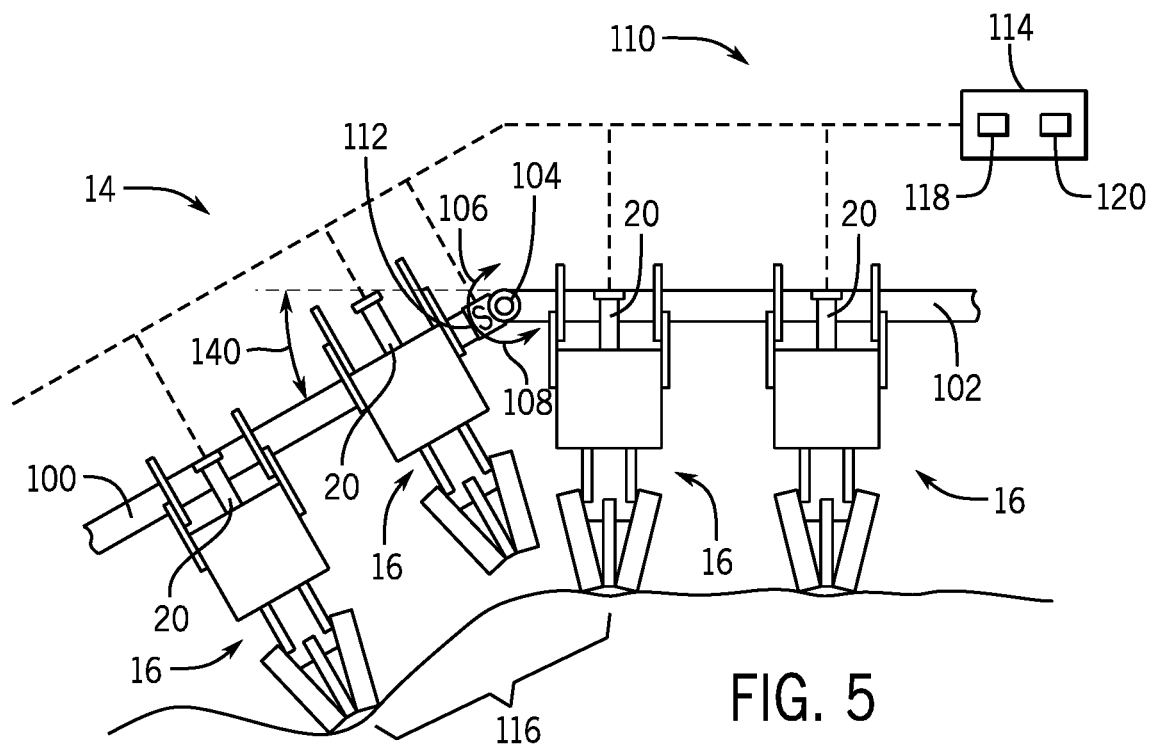
FIG. 5 is a partial rear view of an embodiment of a row unit position control system adjusting the position of a row unit.

In order to block contact between the row units 16 proximate the pivot connector 104, the row unit position control system 110 may actuate one of the down force actuators 20 on the row units 16 proximate the pivot connector 104. As illustrated in FIG. 5, the row unit position control system 110 may control the down force actuator 20 of the row unit 16 proximate the pivot connector 104 on the section 100 to lift the row unit 16. By lifting the row unit 16 on the section 100 proximate the pivot connector 104, the row unit position control system 110 is able to block contact between the row units 16 proximate the pivot connector 104. In addition, by lifting the row unit 16, the row unit position control system 110 is able to maintain the desired spacing between the row units 16 so that the rows facilitate plant growth. It should be understood that instead of lifting the row unit 16 proximate the pivot connector 104 on the section 100, the row unit position control system 110 may actuate the down force actuator 20 to lift the row unit 16 on the section 102 proximate the pivot connector 104 to likewise block contact and maintain a desired row spacing.

Figure 6:
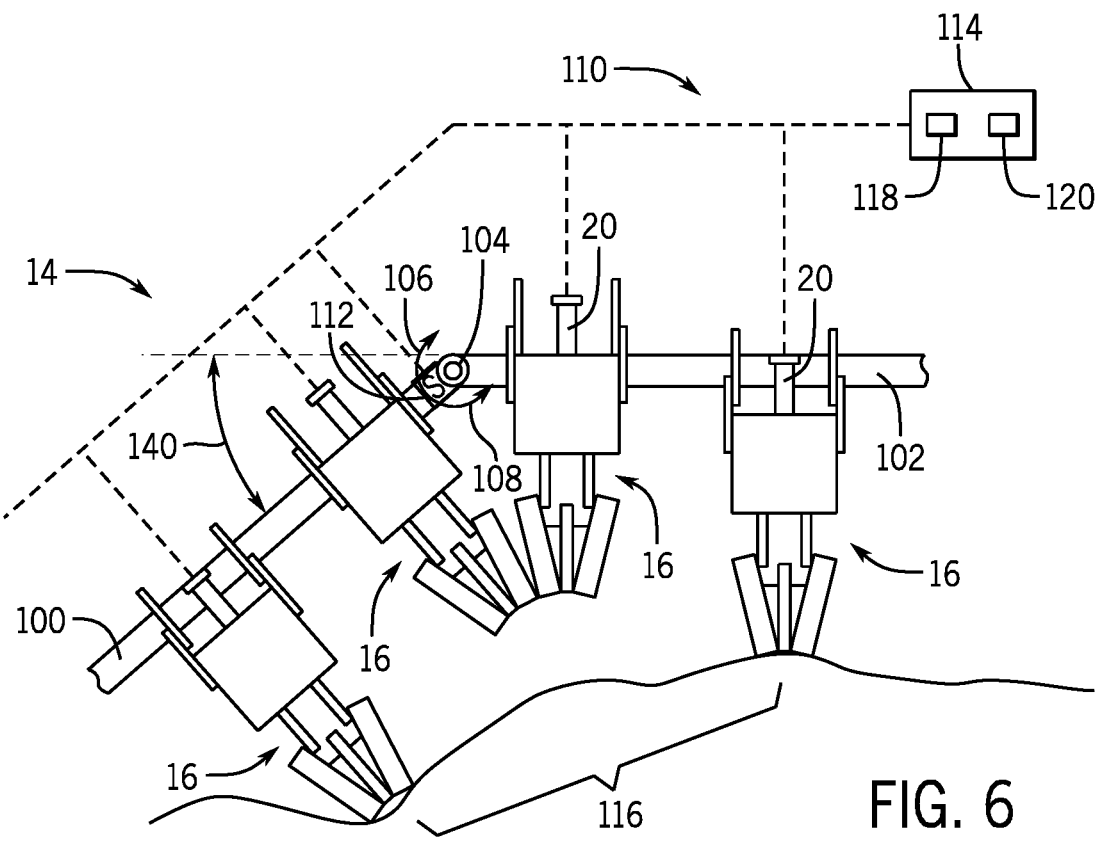
FIG. 6 is a partial rear view of an embodiment of a row unit position control system adjusting the position of row units.

FIG. 6 is a partial rear view of the row unit position control system 110. As illustrated, an increase in the slope of the ground increases the angle 140 as the toolbar section 100 rotates about the pivot connector 104. In response to the increase in the angle 140, the row unit position control system 110 may raise both row units 16 proximate the pivot connector 104 in order to maintain a desire row spacing and/or to block contact between the row units 16.

Figure 7:
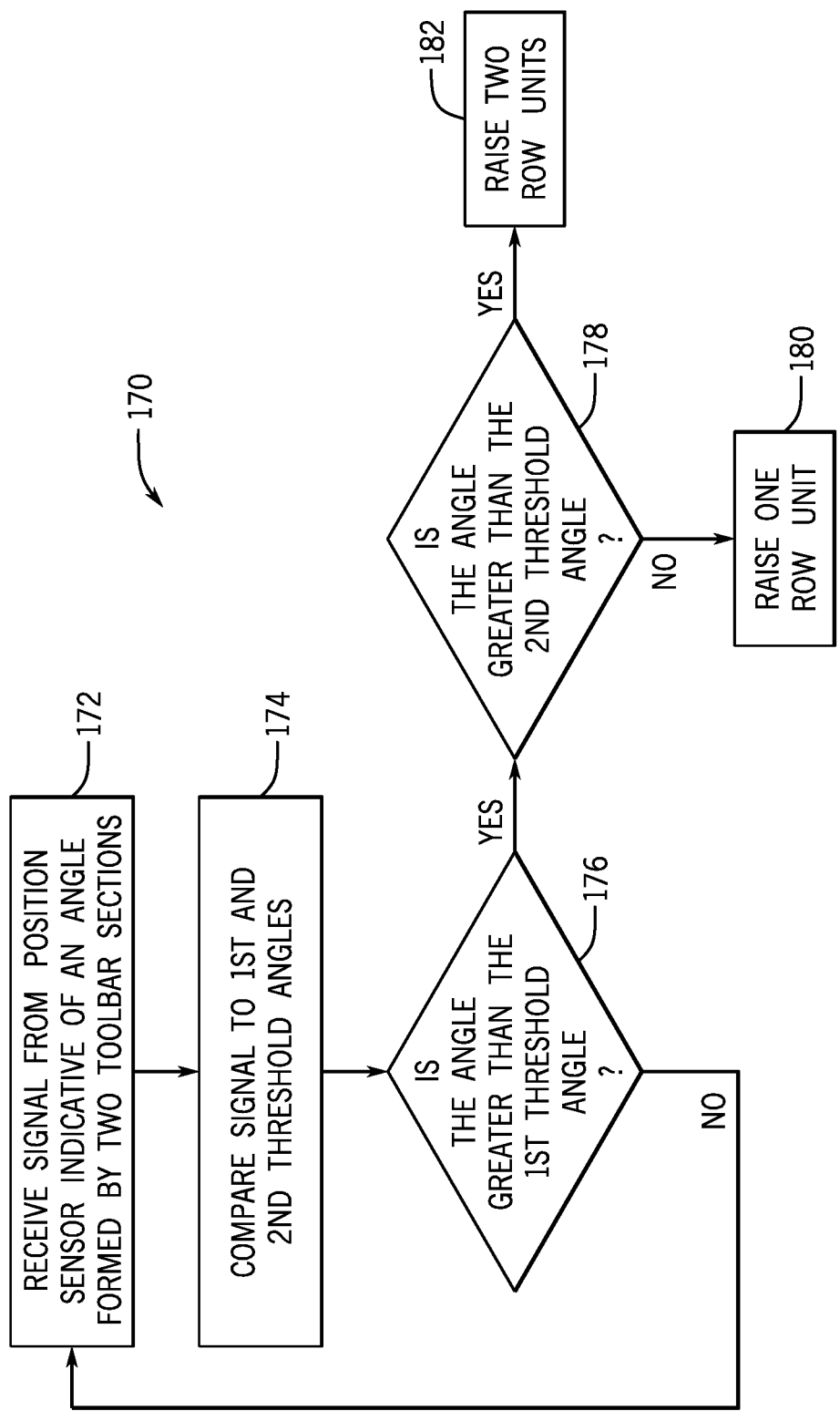
FIG. 7 is a block diagram of an embodiment of a method for controlling the position of row units.

FIG. 7 is a block diagram of an embodiment of a method 170 for controlling the position of row units 16 as the agricultural implement travels over uneven ground. The method begins by receiving a signal from the sensor 112, block 172. The signal emitted by the sensor 112 is indicative of angle 140 formed by toolbar sections, such as section 100 and 102, as they rotate. The method 170 then compares the signal to first and second threshold angles, block 174. The method 170 then determines if the angle 140 is greater than the first threshold angle, block 176. If the angle is not greater than a first threshold angle, the method 170 returns to block 172. However, if the angle is greater than the first threshold angle the method 170 continues by determining if the angle 140 is greater than a second threshold angle, block 178. If the angle 140 is greater than the first threshold angle but not greater than the second threshold angle, the row unit position control system 110 lifts one row unit 16, block 180. However, if the angle 140 is greater than the second threshold angle then the row unit position control system 110 lifts two row units 16, block 182. By controlling the lifting of the row units 16 proximate the pivot connector 104, the agricultural implement 10 may maintain a desired row spacing and/or block contact between row units 16 as it travels over uneven ground.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An agricultural implement system, comprising:
a first toolbar section of an agricultural implement;
a first row unit coupled to the first toolbar section;
a second toolbar section of the agricultural implement;
a second row unit coupled to the second toolbar section;
a pivot connector pivotally coupling the first toolbar section and the second toolbar section, wherein the first row unit is positioned proximate to the pivot connector on the first toolbar section, and the second row unit is positioned proximate to the pivot connector on the second toolbar section;
a row unit position control system, comprising:
a sensor configured to detect an angle of the second toolbar section with respect to the first toolbar section; and
a controller communicatively coupled to the sensor, wherein the controller is configured to raise the first row unit relative to another row unit coupled to the first toolbar section and positioned farther from the pivot connector than the first row unit, to raise the second row unit relative to another row unit coupled to the second toolbar section and positioned farther from the pivot connector than the second row unit, or a combination thereof, based on the angle.

2. The system of claim 1, a first actuator coupled to the first row unit, wherein the controller is configured to control the first actuator to vary a contact force between the first row unit and the ground and to control lifting of the first row unit away from the ground.

3. The system of claim 2, wherein the first actuator comprises an electric actuator, a hydraulic actuator, a pneumatic actuator, or a combination thereof.

4. The system of claim 1, a second actuator coupled to the second row unit, wherein the controller is configured to control the second actuator to vary a contact force between the second row unit and the ground and to control lifting of the second row unit away from the ground.

5. The system of claim 4, wherein the second actuator comprises an electric actuator, a hydraulic actuator, a pneumatic actuator, or a combination thereof.

6. The system of claim 1, wherein the controller is configured to lift the second row unit and not the first row unit in response to the angle exceeding a first threshold angle.

7. The system of claim 1, wherein the controller is configured to lift the first row unit and not the second row unit in response to the angle exceeding a first threshold angle.

8. The system of claim 1, wherein the controller is configured to lift the first row unit and the second row unit in response to the angle exceeding a second threshold angle.

9. A system, comprising:
a row unit position control system, comprising:
a controller configured to communicatively couple to a sensor, wherein the controller is configured to raise a first row unit coupled to a first toolbar section relative to another row unit coupled to the first toolbar section and positioned farther from a pivot connector than the first row unit, to raise a second row unit coupled to a second toolbar section relative to another row unit coupled to the second toolbar section and positioned farther from the pivot connector than the second row unit, or a combination thereof, based on an angle of the first toolbar section with respect to the second toolbar section;
wherein the pivot connector pivotally couples the first toolbar section and the second toolbar section, the first row unit is positioned proximate to the pivot connector on the first toolbar section, and the second row unit is positioned proximate to the pivot connector on the second toolbar section.

10. The system of claim 9, comprising the sensor configured to detect the angle of the first toolbar section with respect to the second toolbar section.

11. The system of claim 9, wherein the controller is configured to lift the second row unit and not the first row unit in response to the angle exceeding a first threshold angle.

12. The system of claim 9, wherein the controller is configured to lift the first row unit and not the second row unit in response to the angle exceeding a first threshold angle.

13. The system of claim 9, wherein the controller is configured to lift the first row unit and the second row unit in response to the angle exceeding a second threshold angle.

14. The system of claim 9, comprising the first toolbar section of an agricultural implement and the first row unit coupled to the first toolbar section.

15. The system of claim 9, comprising the second toolbar section of an agricultural implement and the second row unit coupled to the second toolbar section.

16. An agricultural implement system, comprising:
a first toolbar section of an agricultural implement;
a first ground engaging tool coupled to the first toolbar section;
a second toolbar section of the agricultural implement;
a second ground engaging tool coupled to the second toolbar section;
a pivot connector pivotally coupling the first toolbar section and the second toolbar section, wherein the first ground engaging tool is positioned proximate to the pivot connector on the first toolbar section, and the second ground engaging tool is positioned proximate to the pivot connector on the second toolbar section; and a row unit position control system, comprising:
 a controller, wherein the controller is configured to raise the first ground engaging tool relative to another ground engaging tool coupled to the first toolbar section and positioned farther from the pivot connector than the first ground engaging tool, to raise the second ground engaging tool relative to another ground engaging tool coupled to the second toolbar section and positioned farther from the pivot connector than the second ground engaging tool, or a combination thereof, based on an angle of the second toolbar section with respect to the first toolbar section.

17. The system of claim 16, a sensor communicatively coupled to the controller and configured to detect the angle of the second toolbar section with respect to the first toolbar section.

18. The system of claim 16, wherein the controller is configured to lift the second ground engaging tool and not the first ground engaging tool in response to the angle exceeding a first threshold angle.

19. The system of claim 16, wherein the controller is configured to lift the first ground engaging tool and not the second ground engaging tool in response to the angle exceeding a first threshold angle.

20. The system of claim 16, wherein the controller is configured to lift the first ground engaging tool and the second ground engaging tool in response to the angle exceeding a second threshold angle.

* * * * *